under 35 U.S.C. 154(b) by 146 days.

(12) United States Patent
Bonig et al.

(10) Patent No.: US 9,652,804 B2
(45) Date of Patent: May 16, 2017

(54) DETERMINISTIC AND EFFICIENT MESSAGE PACKET MANAGEMENT

(71) Applicant: Chicago Mercantile Exchange Inc., Chicago, IL (US)

(72) Inventors: Zachary Bonig, Chicago, IL (US); Haifeng Zheng, Chicago, IL (US); Don Mendelson, Chicago, IL (US); Mike Donaghy, Chicago, IL (US); Akrapong Lin, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 146 days.

(21) Appl. No.: 14/134,688

(22) Filed: Dec. 19, 2013

(65) Prior Publication Data
US 2015/0178831 A1    Jun. 25, 2015

(51) Int. Cl.
| | | |
|---|---|---|
| G06Q 40/04 | (2012.01) | |
| H04L 12/833 | (2013.01) | |
| H04L 12/859 | (2013.01) | |
| H04L 12/801 | (2013.01) | |
| H04L 12/863 | (2013.01) | |

(52) U.S. Cl.
CPC ......... *G06Q 40/04* (2013.01); *H04L 47/2475* (2013.01); *H04L 47/31* (2013.01); *H04L 47/34* (2013.01); *H04L 47/6225* (2013.01)

(58) Field of Classification Search
None
See application file for complete search history.

(56) References Cited

U.S. PATENT DOCUMENTS

| | | |
|---|---|---|
| 5,377,354 A | 12/1994 | Scannell et al. |
| 7,949,792 B2 | 5/2011 | Kujk et al. |
| 8,224,235 B1* | 7/2012 | Woo et al. ................. 455/3.01 |
| 8,412,831 B2 | 4/2013 | Detrick et al. |
| 8,539,112 B2 | 9/2013 | Craft et al. |
| 2003/0167223 A1 | 9/2003 | Pledereder et al. |
| 2005/0021445 A1 | 1/2005 | Caro |
| 2005/0286527 A1 | 12/2005 | Tieu et al. |
| 2008/0243675 A1 | 10/2008 | Parsons et al. |
| 2010/0057608 A1 | 3/2010 | McPherson |
| 2012/0041894 A1* | 2/2012 | Glodjo et al. .............. 705/36 R |

OTHER PUBLICATIONS

Wikipedia page "FAST TCP", en.wikipedia.org/wiki/FAST_TCP, retrieved Dec. 18, 2013, 3 pages.

(Continued)

*Primary Examiner* — Robert R Niquette
*Assistant Examiner* — Joseph W King
(74) *Attorney, Agent, or Firm* — Lempia Summerfield Katz LLC

(57) ABSTRACT

Methods, devices, and systems for facilitation of deterministic management of a plurality of electronic message packets communicated to an application via a network from a plurality of message sources. The facilitation involves receiving each of the plurality of electronic message packets from the network, determining an order in which each electronic message packet was received relative to the reception of others of the plurality of electronic message packets, and providing the order to the application.

18 Claims, 8 Drawing Sheets

(56) References Cited

OTHER PUBLICATIONS

International Search Report and Written Opinion, from PCT/US2014/069939, Mar. 13, 2015, WO.
"High Performance Trading—Deployment of Leading Edge Technology Thinking", Argon Design, 2013, 2 pages.
low-latency.com, "Groundbreaking Results for High Performance Trading with FPGA and x30 86 Technologies", Newswire, Sep. 25, 2013, 2 pages.

* cited by examiner

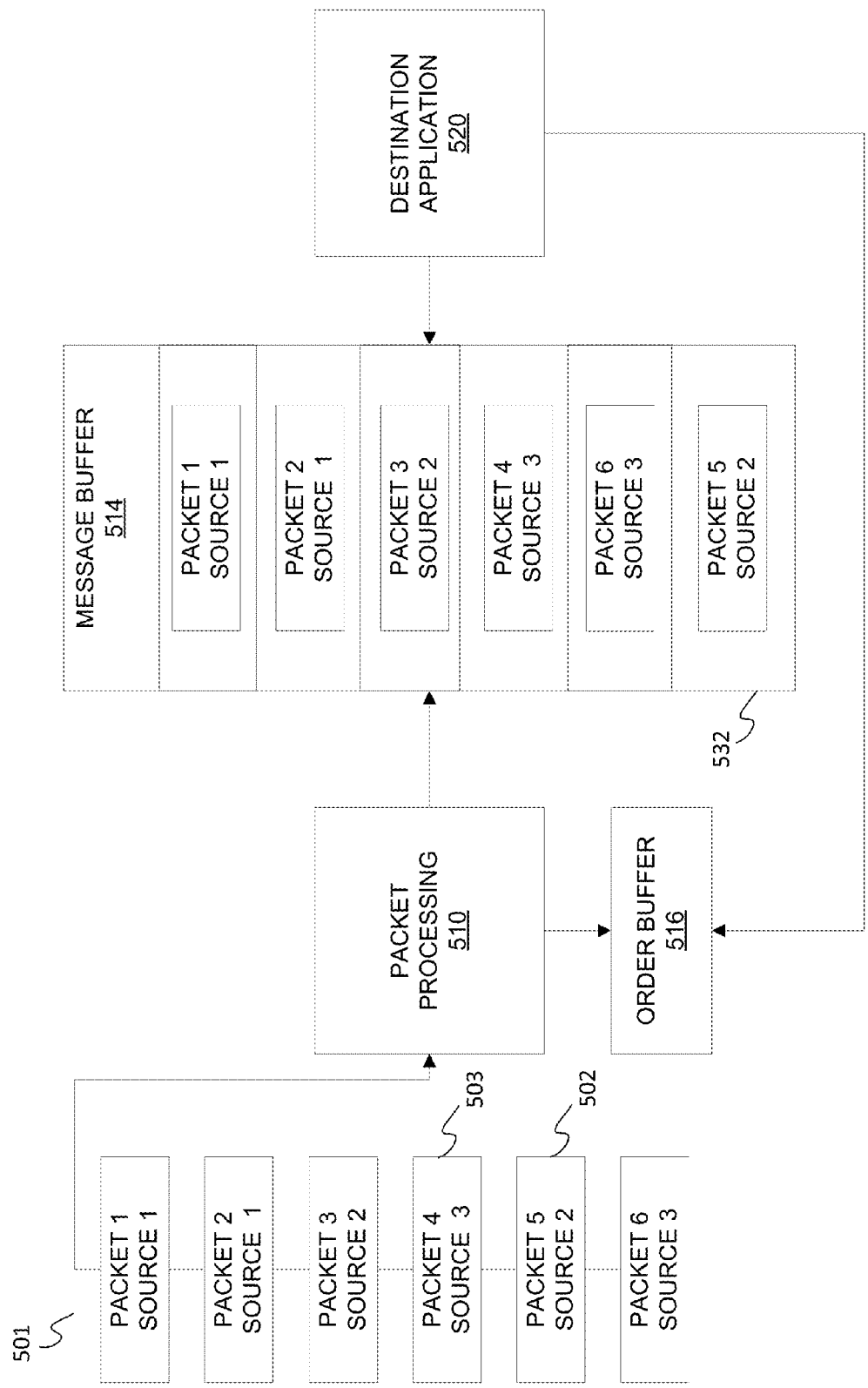

DETERMINISTIC AND EFFICIENT MESSAGE PACKET MANAGEMENT

BACKGROUND

A financial instrument trading system, such as a futures exchange, referred to herein also as an "Exchange", such as the Chicago Mercantile Exchange Inc. (CME), provides a contract market where financial instruments, for example futures and options on futures, are traded. Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price.

Current electronic financial instrument trading systems may allow traders to submit orders to buy or sell contracts electronically to an order book maintained and managed by an exchange. The orders may be submitted electronically to the order book through an order entry gateway using electronic messages formatted as units of data known as packets.

Packets and packet switched networks are used extensively in electronic communications. Packet switched networks utilize a digital networking communications method that groups all transmitted data—regardless of content, type, or structure—into suitably sized blocks, called packets. Generally, packets may contain control information as well as user data, also known as a payload or actual content. Typically, the control information provides data the network needs to deliver the user data such as source and destination network addresses and the user data is involves the actual content intended to be communicated between the source and the destination. For example, packets may be considered messages, with the control information providing addresses or information about the actual content of the message included as user data.

Electronic message packets may be communicated via networks. Generally, a network interconnects one or more computers so that they may communicate with one another, whether they are in the same room or building (such as a Local Area Network or LAN) or across the country from each other (such as a Wide Area Network or WAN). A network is a series of points or nodes interconnected by communications paths. Networks can interconnect with other networks and can contain sub-networks. A node is a connection point, either a redistribution point or an end point, for data transmissions generated between the computers which are connected to the network. In general, a node has a programmed or engineered capability to recognize and process or forward transmissions to other nodes. The nodes can be computer workstations, servers, bridges or other devices but typically, these nodes are routers or switches. Electronic message packets may be communicated from an origin through a series of nodes to an intended final destination.

Further, even as electronic message packets arrive at a destination, the handling of the electronic message packets at the destination may also involve multiple steps, component interactions, and processes until the message is ultimately received by a destination application for use thereby. This process may be further complicated if multiple electronic message packets from multiple origins are communicated to a common destination application using communication protocols that organize electronic message packets based on origin for processing at the common destination. For example, a communication protocol may indicate that a buffer will be created for each source at the destination, and that electronic message packets from each source will be placed in the respective buffer for each source at the destination. This arrangement may require the destination, and ultimately the intended destination application for the electronic message packets, to monitor a significant number of buffers for new messages. These involved processes and potential multiple buffers may also allow electronic message packets from different sources to "pass" each other such that an original order of the electronic message packets is lost as the electronic message packets travel to the common destination application, or when the message packet payload is consumed or used by the common destination application.

Some applications which utilize packet switching networks may involve deterministic requirements that place a priority on individual electronic message packets based on arrival, i.e. the order thereof, of the electronic message packets. These applications may involve lottery systems, ticketing systems, auction systems, financial message systems, or any other application where priority may be provided to a message over another message based on earlier receipt than the other message. The network communication process, as well as the complications involved in the processing of packets once they arrive at a destination so that they are recognized and/or consumed by the destination application, may make it difficult to determine a priority between electronic message packets from different origins, arriving at the common destination within a small time period.

For example, to gain and maintain the trust and confidence of market participants and encourage participation, electronic trading systems ideally attempt to offer a more efficient, fair and balanced market where market prices reflect a true consensus of the value of traded products among the market participants, and which minimize, if not eliminate, surreptitious or overt subversion, influence of, or manipulation by, any one or more market participants, intentional or otherwise, and unfair or inequitable advantages, with respect to access to information or opportunities. To accomplish these goals, for example, electronic trading systems should operate in a deterministic, i.e. a causal, predictable, or otherwise expected, manner as understood and experienced by the market participants, i.e. the customers of the Exchange. Electronic trading systems which implement markets which are overtly or covertly inefficient, unfair or inequitable risk not only losing the trust, along with the patronage, of market participants, but also increased regulatory scrutiny as well as potential criminal and/or civil liability.

Accordingly, the operators of electronic trading systems, alone or in conjunction with, or at the direction of, regulatory or industry organizations, typically publish or otherwise promulgate rules or regulations, referred to as business or operating rules, which govern the operation of the system. These rules define how, for example, multiple transactions are processed by the system where those transactions have relationships or dependencies there between which may affect the result of such processing. Such business rules may include, for example, order allocation rules, i.e. rules which dictate which of multiple competing resting orders will be matched with a particular incoming order counter thereto having insufficient quantity to fill all of the suitable resting orders. For example, under a first-in-first-out methodology, the first order, of the competing resting orders, that was received by the electronic trading system will be matched with the incoming counter-order and filled to the extent possible by the available quantity, with any residual quantity of the incoming counter order then being allocated to the next received suitable competing resting order and so on until the available quantity of the incoming counter order is exhausted. However, additional or alternative matching/allocation rules may be implemented as well, for example to ensure fair and equal access, improve trading opportunities, etc., by allocating, such as proportionally, the available quantity of the incoming counter order among all, or a subset, of the competing resting orders until the available quantity is exhausted.

Once such business rules are established, or modified, market participants will expect, and overseeing regulatory entities may require, that the electronic trading system operate in accordance therewith. That is, if the Exchange adopts a rule to give first arriving orders priority over later arriving orders, a market participant who submits an earlier arriving order will expect their order to be filled prior to a later arriving order submitted by another market participant. It will be appreciated that these rules, by which operators of an electronic trading system may choose to operate their system, may vary at the discretion of the operators, subject to regulatory concerns. Generally, the term "transactional determinism" may refer to the processing, or the appearance thereof, of orders in accordance with the defined business rules.

BRIEF DESCRIPTION OF THE DRAWINGS

FIGS. 5A, 5B, and 5C illustrate packet processing.

DETAILED DESCRIPTION

Figure 1:
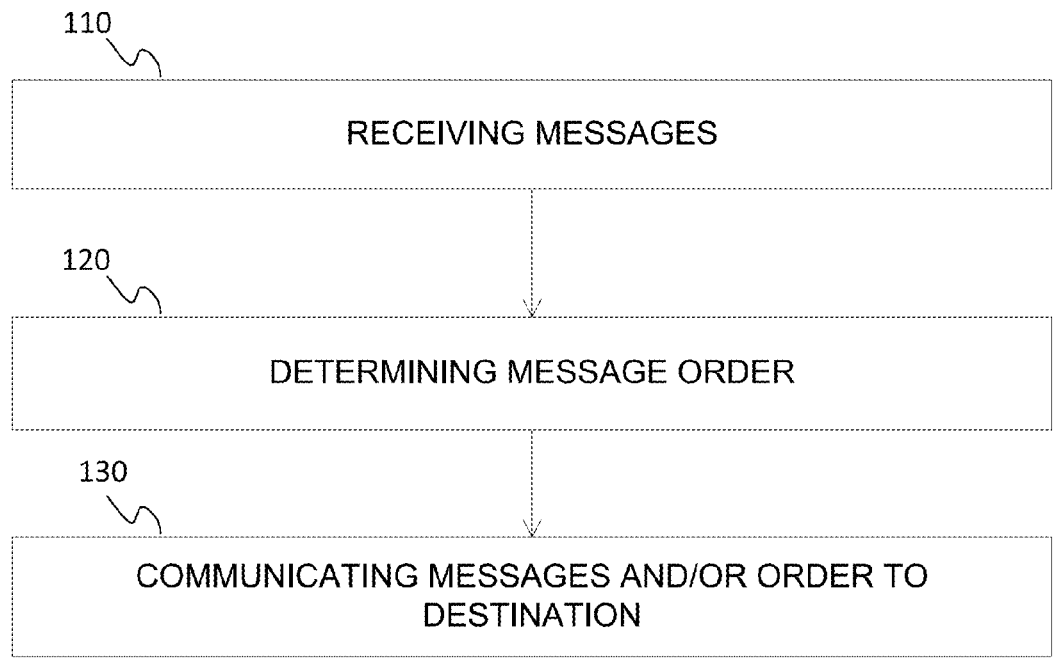
FIG. 1 depicts a flow chart for a method involving the facilitation of deterministic message management.

Packets transmitted from different sources to a common intended destination may be processed in accordance with deterministic operating requirements by determining an order in which the packets arrive, such as based on their arrival at a common point in a network through which the packets must travel to get to their intended destination. The packets may then be communicated, along with data indicative of their arrival order, to the intended destination of the packets. The packets may be communicated to the intended destination in a manner exhibiting and/or maintaining the designated order, or the packets and the determined order may be communicated separately to the final destination. The disclosed embodiments may relate to communication of financial messages from multiple market participants to an exchange, such as the Chicago Mercantile Exchange ("CME"), to facilitate the matching of trades based on a deterministic management of the financial messages, however, it will be realized by those in the art that embodiments may relate to any packet messaging system where deterministic processing may be desired or required.

The following embodiments may alleviate the issues related to processing and determining priority of message packets at a destination application after the message packets have been communicated through a network and processed by a common destination. For example, the ability to determine an order of incoming messages, regardless of message packet origin, may be determined and provided to a common destination application of the incoming messages. Further, the following embodiments may reduce the resources required to handle a large volume of message packets.

In an exemplary embodiment, a financial market may implement rules defining priority for the matching of incoming orders against previously received, but unsatisfied orders entered in an order book, and ultimately matched using a match engine. Establishing a priority for a plurality of electronic message packets that represent incoming orders may involve deterministic processing of the electronic message packets such that earlier received packets, comprising the earlier received order, receive higher priority for being matched than later received packets. The deterministic processing, or management, of the plurality of electronic message packets ultimately communicated to an order entry gateway via a network from multiple different trading entities may be facilitated by receiving each of the plurality of electronic message packets representing orders from the network. The deterministic processing may be further facilitated by determining upon receipt of the electronic message packets, but prior to the received electronic message packets being provided to the order entry gateway, an order in which each electronic message packet was received relative to the reception of others of the plurality of electronic message packets, the order being determined irrespective of which trading entity of the multiple different trading entities each of the received electronic message packet originated from. The deterministic processing may also be facilitated by providing the electronic message packets to the order entry gateway. For example, the electronic message packets may be provided in a single buffer regardless of the trading entity that originated the electronic message packet. Another buffer may also be provided indicating the order in which the electronic message packets were received. The order entry gateway may then be configured to collect the electronic message packets and the determined order from the two buffers and provide them to an order book or a match engine. A match engine may then use the electronic message packets and the determined order to match orders represented by the electronic message packets based on a priority determined from the determined order.

In accordance with aspects of the disclosure, systems and methods are disclosed for packet processing and facilitation of deterministic packet management. The disclosed embodiments are preferably implemented with computer devices and computer networks, such as those described with respect to FIG. 4, that allow users, e.g. market participants, to exchange information with a common destination, e. g. a market. It will be appreciated that the plurality of entities utilizing the disclosed embodiments may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

The following embodiments may relate to electronic message packets communicated using any communicative network, including the internet. The Internet, in particular, is a worldwide network which primarily uses the Transport Control Protocol and Internet Protocol ("TCP/IP") to permit the exchange of information including electronic message packets. At a higher level, the Internet supports several applications protocols including the Hypertext Transfer Protocol ("HTTP") for facilitating the exchange of HTML/World Wide Web ("WWW") content, File Transfer Protocol ("FTP") for the exchange of data files, electronic mail exchange protocols, Telnet for remote computer access and Usenet ("NNTP" or Network News Transfer Protocol) for the collaborative sharing and distribution of information. It will be appreciated that the disclosed embodiments may relate to messages communicated using the TCP protocol, however the disclosed embodiments are applicable to messages communicated using many different transport protocols both now and later developed. For example, the enclosed embodiments may relate to the use of User Datagram Protocol ("UDP") techniques to communicate messages.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

FIG. 1 depicts a flow chart of the operation of a system for facilitating deterministic message management. The system may be implemented with computer devices and computer networks, such as those described with respect to FIG. 4.

In an embodiment, messages are received from any number of message origins sharing a common destination from a position of a network (Block 110). The position may be selected as a designated location where an arrival order of messages may be determined. Generally, the position may be selected as a position where messages requiring a deterministic assignment of order must pass to reach the common destination, or destination application. In an embodiment, the position may be chosen as a common point of ingress into a system representing a common destination for the messages.

Receiving may be performed using any technique operable to acquire or remove the messages from a path through the network upon which the messages are traveling. In an embodiment, the messages are received at the common destination using a network interface controller ("NIC"). Any NIC may be used, however in an embodiment, a NIC may be adapted to implement embodiments disclosed herein using various hardware or software components and configurations, such as those disclosed with respect to FIG. 4. For example, a NIC may involve multiple (i.e. four) Small Form-Factor Pluggable transceivers ("SFP") to interface with a network, a Digital Signal Processor ("DSP") to transform signals from the network into data, an Altera Stratix® series Field Programmable Gate Array ("FPGA") to perform operations with/on the data, NIC specific Random Access Memory ("RAM") sized at 48 Gigabytes, a NIC specific Precision Time Protocol ("PTP") clock, and a Peripheral Component Interconnect port to connect the NIC to a server or other computer.

In an embodiment, an order that messages are received is determined (Block 120). A message order may involve the chronological order in which each message is received. The order may be designated using any technique operable to relay a tangible representation of the order. A representation of the order may involve arranging and storing the messages based on the order, modifying the messages to provide an indication of the order, associating a listing of the order with the messages, or any combination of these or other representations of the order.

In an embodiment the messages are communicated to a destination (Block 130). The destination may be the common destination for the messages. The messages may be communicated using any technique operable to relay the messages to the common destination. For example, the communication may be via the network the messages from which the messages were received, or another network. The messages may be required to flow through additional nodes after being communicated, but prior to reaching the common destination. In an embodiment, the destination may be considered an application at the common destination, or application destination, at which the messages respective origins intended to be the operative application on the message. For example, the payload of a message may contain data for use by the application destination.

The communicating (Block 130) may involve the communication of a determined message order such that a common destination application is able to establish a determined order in which the messages were received. The determined message order may be represented in any format, and communicated using any communicative technique. In an embodiment, a determined message order may be communicated as table containing message arrival times at the common destination for the received messages. This table may be communicated by storing it on a memory, and informing the application destination of the existence of the table.

Figure 2A:
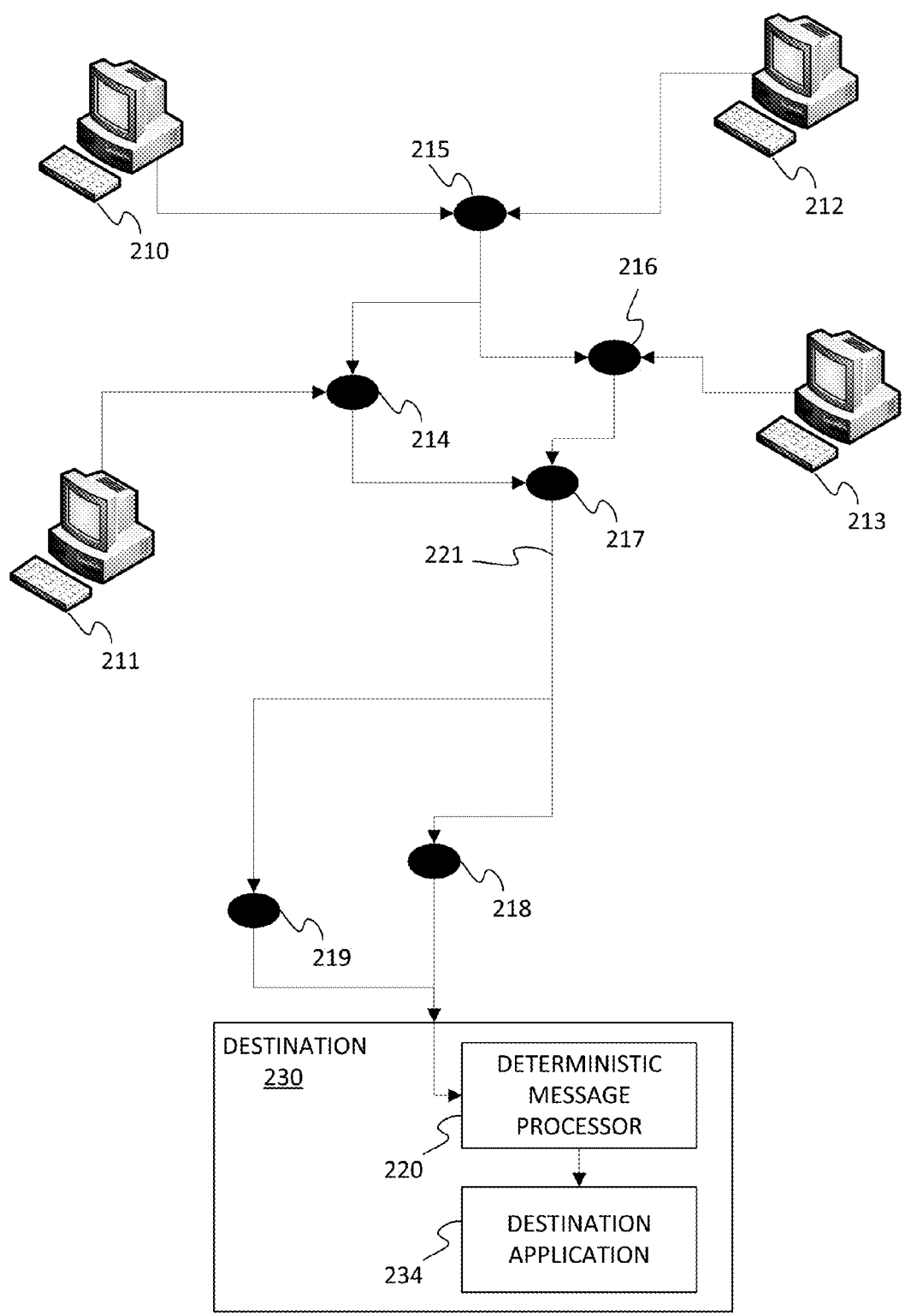
FIG. 2A depicts a system for deploying deterministic message management and efficient message processing.

FIG. 2A depicts a networked system for deploying deterministic message management facilitation. The system involves multiple sources 210, 211, 212, 213 connected to nodes 214, 215, 216 of a network that may be used for communicating electronic message packets to a common destination 230. Each of the multiple sources 210, 211, 212, 213 may transmit multiple electronic message packets to the common destination 230. The system may also involve other nodes 217, 218, 219 through which the electronic message packets may pass to reach the common destination 230. The system may also include a deterministic message processor 220 that may facilitate deterministic processing or management of the electronic message packets. Embodiments may provide that the sources 210, 211, 212, 213, destination 230, and the deterministic message processor 220 are implemented with computer devices and computer networks, such as those described with respect to FIG. 4. An embodiment may also provide that the deterministic message processor is a component of a destination 230 implemented with computer devices and computer networks, such as those described with respect to FIG. 4.

In an embodiment, the deterministic message processor 220 may interface with the network such as to receive the electronic message packets from the sources 210, 211, 212, 213 for the destination 230. In an embodiment, the deterministic message processor 220 may be integrated with the destination 230 such that the destination 230 interfaces the network through the deterministic message processor. In another embodiment, the deterministic message processor 220 may be positioned so as to interface on the network at a position 221 configured such that all electronic message packets requiring deterministic processing must flow through the position 221 to reach the destination 230.

The deterministic message processor 220 may be operational to facilitate the deterministic management of electronic message packets. In an embodiment, the deterministic message processor 220 may be operational to intercept or receive electronic message packets from multiple sources 210, 211, 212, 213 prior to providing the electronic message packets, or the payload of the electronic message packets, to the destination application 234. The deterministic message processor 220 may also be operational to determine an order that the electronic messages were received. The deterministic message processor 220 may also be operational to communicate or provide the received electronic message packets to the destination application 234 along with the designation of the received order of the electronic message packets.

In an embodiment, the deterministic message processor 220 may be a system for facilitation of deterministic management of a plurality of electronic message packets communicated to a destination application 234 via a network from a plurality of message sources 210, 211, 212, 213. The system may be implemented with computer devices and computer networks, such as those described with respect to FIG. 4. For example, the system may involve at least one processor 402 configured to cause the system to receive each of the plurality of electronic message packets from the network. The at least one processor 402 may also be configured to cause the system to determine, upon receipt thereof prior to the received packet being provided to the application, an order in which each electronic message packets was received relative to the reception of others of the plurality of electronic message packets, the order being determined irrespective of which message source of the plurality of message sources 210, 211, 212, 213 each of the received electronic message packets originated from. The at least one processor 402 may also be configured to cause the system to provide the order to the application by storing the order, or a representation of the order, on a memory 404 to which the destination application 234 has access. In an embodiment, the order is stored on a memory 404 in the form of a buffer associating each message of the plurality of electronic message packets with the order. The buffer may be further operable to be read by the destination application 234. In an embodiment, the plurality of electronic message packets may be provided for the destination application 234 in a singular buffer stored on the memory 404. Each of the plurality of electronic message packets may be stored in the singular buffer, and accessible by the destination application, irrespective of the particular source of each electronic message packet.

A packet may be considered received at the deterministic message processor 220 when the packet is received in any reliable or verified manner. In an embodiment, packets may be considered received when an acknowledgment has been transmitted to the message source of the plurality of message sources 210, 211, 212, 213 that originated the packet being received. For example, TCP primarily uses an acknowledgment scheme for packet receipt acknowledgment, where a receiver of a packet sends an acknowledgment signifying that the receiver has received all data preceding or associated with the acknowledged sequence number. A packet may be considered received upon the transmission of the acknowledgement. In another embodiment, a packet may be considered received at the moment a network interface receives data indicating the packet.

Figure 2B:
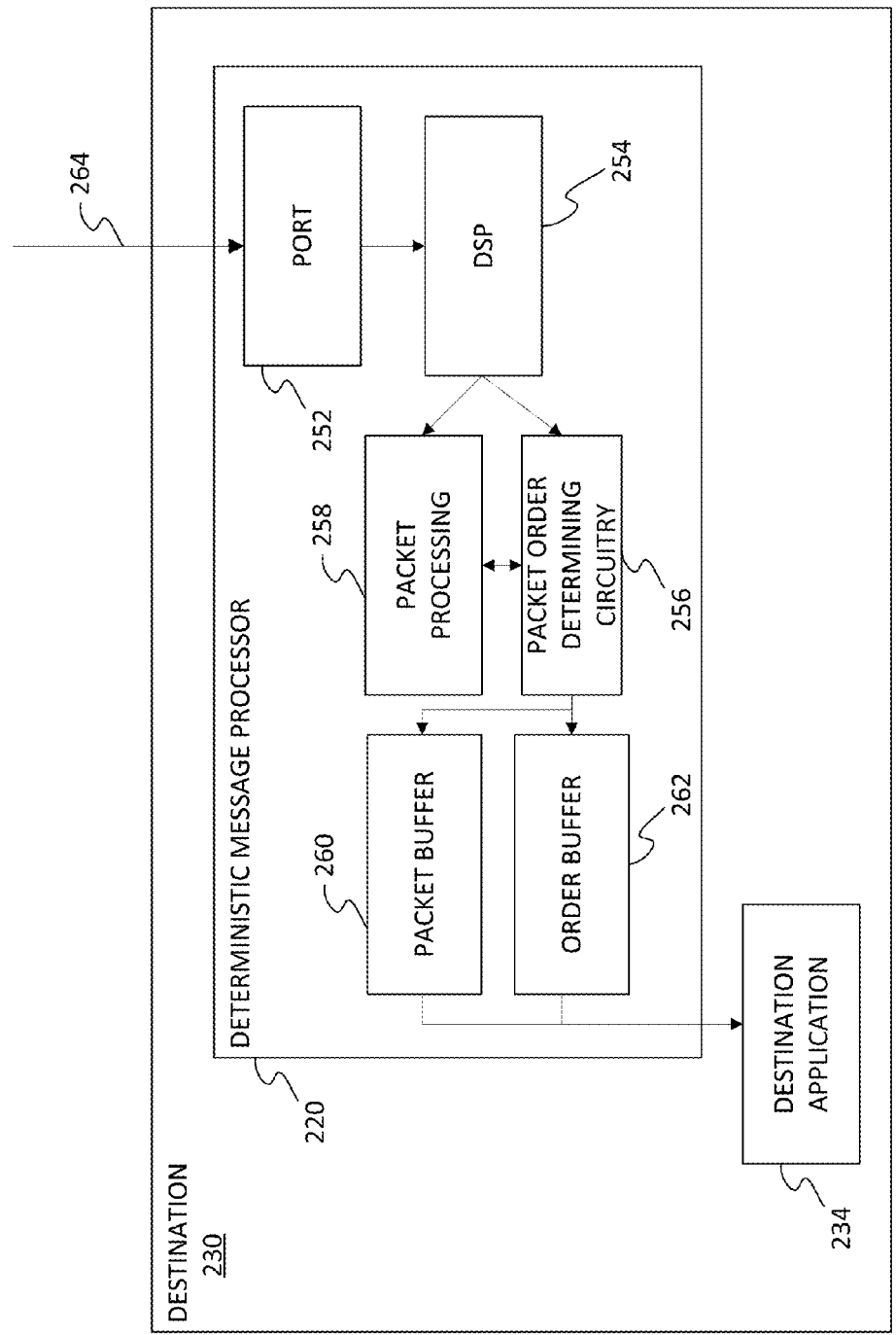
FIG. 2B depicts the destination of the system for deploying deterministic message management and efficient message processing depicted in FIG. 2A.

FIG. 2B depicts a more detailed diagram of the destination 230 of FIG. 2A. Electronic message packets arrive as electrical impulses from the network 264 at the destination 230 by way of the port 252 of the deterministic message processor 220. The electrical impulses are then processed at the Digital Signal Processor ("DSP") 254 into binary digital signals readable by the packet order determining 256 and packet processing 258 as packets. The DSP 254 then provides the packets to packet processing 258 and the packet order determining 256. The packet order determining 256 determines an order of the packets from the DSP 254. For example, the packet order determining 256 may designate a time stamp the packet was received from the DSP 254. Packet processing 258 processes the packets according to a determined protocol, such as TCP. When packet processing 258 completes the processing of a packet, it instructs the packet order determining 256 as such and the packet order determining 256 writes the packet to the packet buffer 260. The packet order determining 256 may also configure the order into a format readable by the destination application 234 to provide an order of receipt for the messages of the packet buffer 260, and write the order to the order buffer 262. The destination application 234 may then retrieve the messages from the packet buffer 260 and the order from the order buffer 262.

In an embodiment, for example a TCP based packet processing 258 embodiment, messages intended for a destination application 234 may involve multiple packets. A message may be considered received upon the receipt of any of the packets that make up the message. In an embodiment, a message involving multiple packets is considered received when the first packet of the message is received. In another embodiment, a message involving multiple packets is considered received when the last packet of the message is received. In an embodiment, a message involving multiple packets is considered received when a certain percentage of the packets of the message are received. In an embodiment, a message involving multiple packets is considered received when the all of the packets are assembled in the packet buffer 260.

Figure 3:
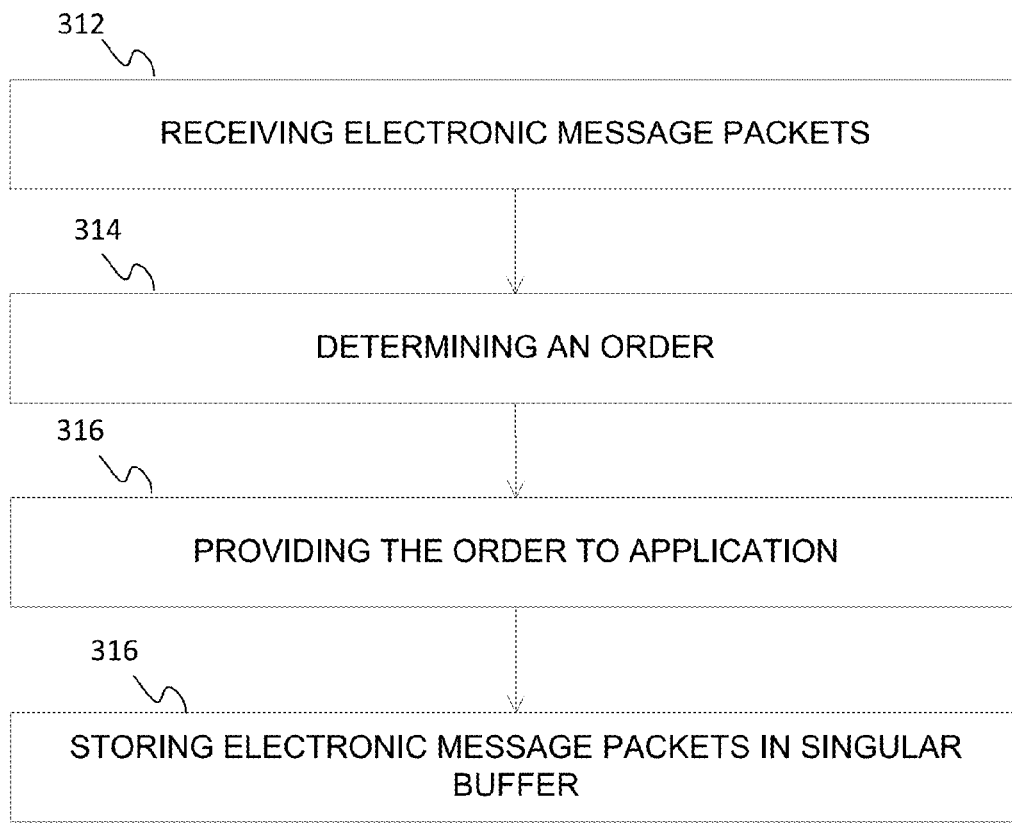
FIG. 3 depicts a block diagram of embodiments for deterministic message management and efficient message processing.
Figure 4:
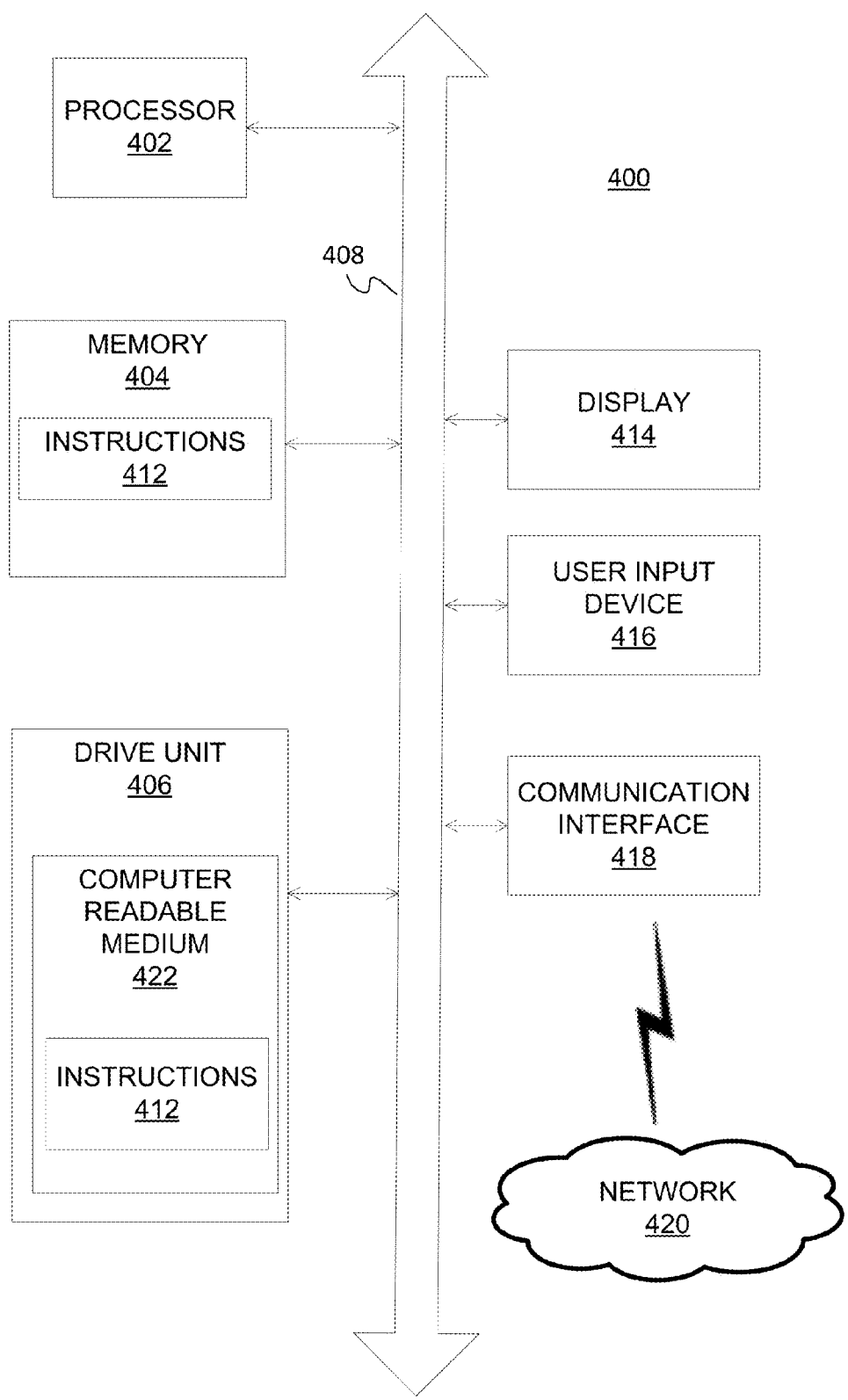
FIG. 4 shows an illustrative embodiment of a general computer system for deterministic message management and efficient message processing.

FIG. 3 depicts a block diagram of an embodiment involving a system for facilitation of deterministic management of a plurality of electronic message packets communicated to an application via a network from a plurality of message sources, which may be implemented with computer devices and computer networks, such as those described with respect to FIG. 4. The application may be a common application at the destination to which all of the plurality of electronic message packets are intended. In an embodiment, the plurality of electronic message packets comprise financial messages, the plurality of message sources comprise market participants, and the application comprises an order entry gateway for use with an exchange operational to match trades using the financial messages. Embodiments may involve all, more or fewer actions indicated by the blocks of FIG. 3. For example, an embodiment may involve receiving (Block 312) and storing (318). Another embodiment may involve receiving (Block 312), determining (Block 314), and providing (Block 316).

The electronic message packets may be transmitted or communicated from a source to the common destination using any technique or protocol. In an embodiment, each of the electronic message packets are formatted for transmission using Transmission Control Protocol ("TCP").

An embodiment involves receiving each of a plurality of electronic message packets from the network. The plurality of electronic message packets may be received at a network interface for a common destination for the electronic message packets (Block 312).

An embodiment involves determining an order in which each electronic message packet was received relative to the reception of others of the plurality of electronic message packets. The order may be determined upon receipt of the electronic message packet (Block 314). Also, the order is determined irrespective of which message source of the plurality of message sources each of the received electronic message packets originated from. The order may be indicated by any technique. In an embodiment, the message order may involve data indicative of a time of receipt of each of the plurality of electronic message packets. For example, a time of receipt may be associated with each of the plurality of electronic message packets. The times of receipt may be associated using any technique. For example, the time of receipt for a package may be listed in a table with an indicator of the specific electronic message packet to which it applies. In another embodiment, the indicator may be an indicator of a location or position in which the particular electronic message packet is stored. In another embodiment, a sequential series of numbers is assigned to each of the plurality of electronic message packets indicating an order.

An embodiment involves providing the order to the application (Block 316). The order may be provided using any technique. For example, the message order may be provided in a buffer available to the application.

In an embodiment, the plurality of electronic message packets may also be provided for the common destination application in at least one message buffer, and wherein the message order is provided in a buffer separate from the at least one message buffer.

An embodiment may provide for storing each of the received electronic message packets are stored in a single buffer irrespective of which message source of the plurality of message sources each of the received electronic message packets originated from, the single buffer being accessible by the application (Block 316). The storing of the electronic message packets may occur upon the receipt of the electronic message packets. Also, source information of each of the plurality of electronic message packets may be maintained and provided with the organized electronic message packets for the common destination application.

In an embodiment, the plurality of message sources are each indicated on a list of sources, and wherein interfacing further comprises determining whether each message of the plurality of messages originated from a source included on the list of sources. The determination may be performed at receipt of the electronic message packets by analyzing header or routing data of the electronic message packets for data indicating the specific sources of on the list of sources.

In an embodiment, the plurality of electronic message packets may involve financial messages, the plurality of message sources may involve market participants, and the common destination application may involve an order entry gateway for use with an exchange operational to match trades using the financial messages.

In an embodiment, the order in which each electronic message packet was received may be used by the application to determine a relative priority for each received electronic message packet of the plurality of electronic message packets.

Figure 5A:
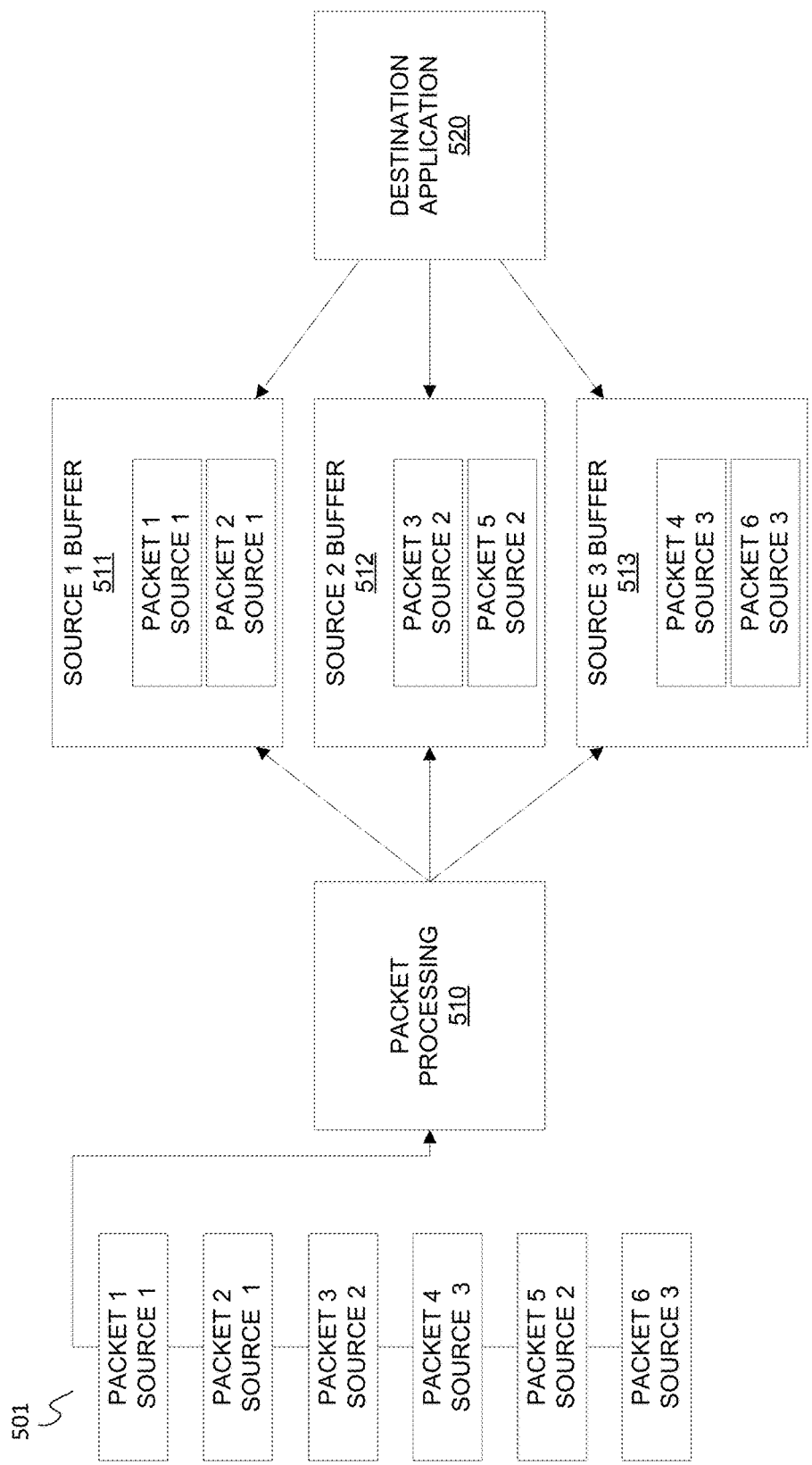

FIG. 5A illustrates a traditional TCP packet processing engine. Packets 501 are received into packet processing 510 where they are sorted into particular source buffers 511, 512, 513 for each particular source of the packets 501. The packets 501 then await collection by the destination application 520. The packets 501 may be sorted within a particular source buffer 511, 512, 513, however, an overall order of all packets may not be determined from this type of buffered storage arrangement.

Figure 5B:
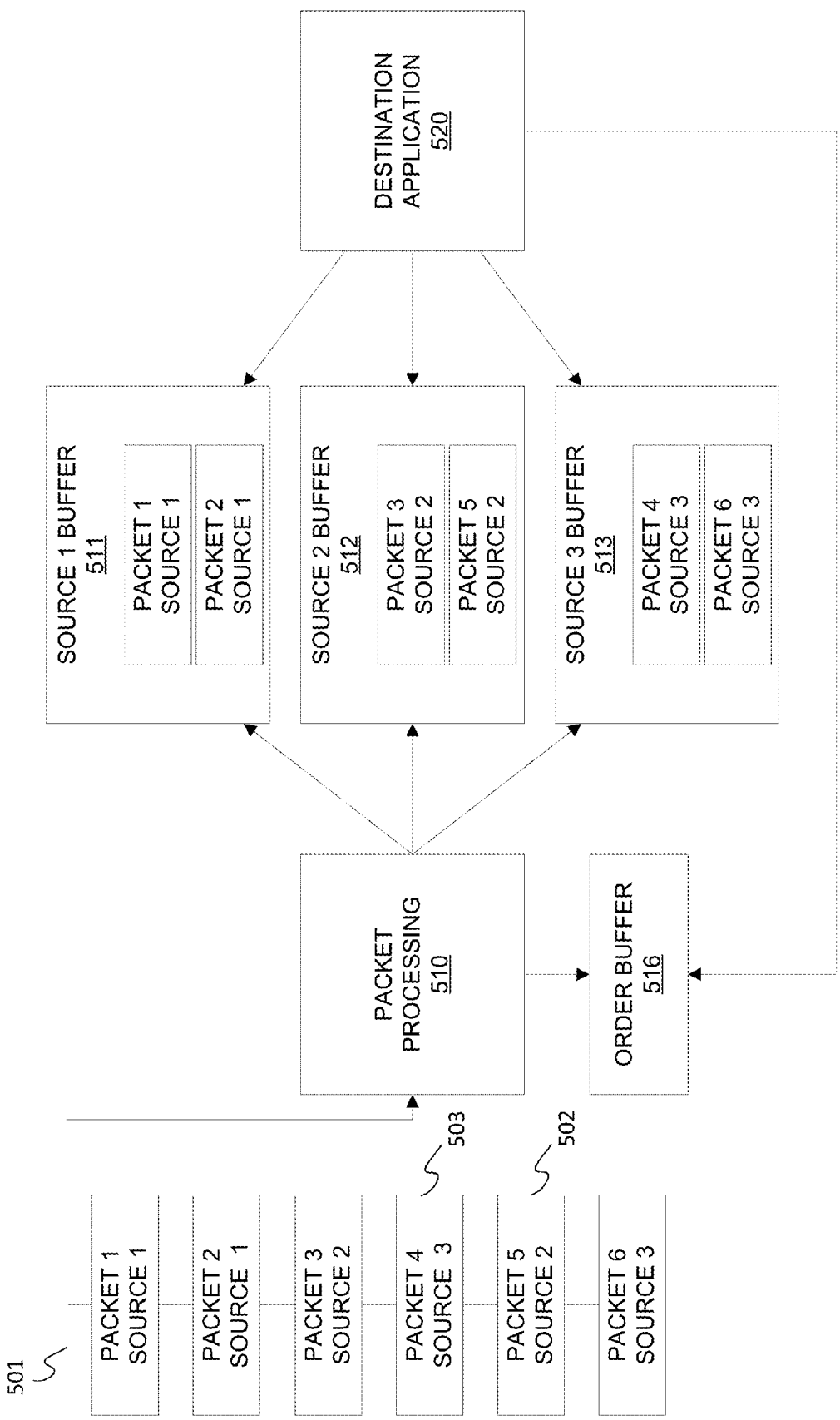

FIG. 5B illustrates an embodiment where packet processing 510 involves determining an order of receipt of the packets 501. Prior to any packets 501 being received, the buffers 511, 512, 513 may contain no packets. As each of the packets 501 is received, an order relative to other packets is determined and the packets are placed into particular source buffers 511, 512, 513. For example, as a packet 503 is received at packet processing 510 a time of receipt may be determined as a part of the packet processing 510. Packet processing may then place the packet 503 into a buffer 513 based on the source of the packet 503. Another packet 502 may then be received later in time than a previous packet 503. The order that the other packet 502 arrived relative to the previous packet 503 may be recorded. For example, the time of receipt of the other packet 502 by packet processing 510 may be recorded and/or associated with the other packet 502 and the packet 502 may be placed in a particular source buffer 512 for the source of the other packet 502. In this example, the differing time of receipt for the packets 503, 502 may be an indicator of an order for the packets 503, 502, and may be recorded into the order buffer 516. For example, the time of receipts for the packets 503, 502 may be associated with the respective packet 503, 502, and stored in the order buffer. The packets 503, 502 then remain in the source buffers 513, 512 until a destination application 520 retrieves the packets 503, 502 and the respective order of receipt for the packets 503, 502.

In an embodiment, the order may be formatted into an order buffer 516 wherein the destination application 520 can use the provided order to determine the order of the packets in the source buffers 511, 512, 513. For example, the order buffer 516 may associate individual identification numbers of the packets 501 with an ordinal indicating a relative position of a particular packet of the packets. For example, Packet 1 may be assigned an ordinal such as 001 and an identification number such as 1:1, whereas Packet 3 may be assigned an ordinal of 003 and an identification number such as 2:1, and these indicators may be stored in a table in the order buffer 516 such that the destination application 520 may use the indicators to determine that Packet 1 was received before Packet 3. Therefore, even though the packets 501 are stored in source buffers 511, 512, 513 similar to FIG. 5A, an order of receipt of the packets 501 may still be communicated to a destination application 520 for further deterministic processing of the packets 501.

FIG. 5C illustrates an embodiment where packet processing 510 involves determining an order of receipt of the packets 501. In this embodiment, packets 501 are received similar to the way packets are received in FIGS. 5A and 5B, however, packet processing 510 also places the packets 501 into a singular message buffer in particular positions 531, instead of the particular source buffers 511, 512, 513 of FIGS. 5A and 5B. For example, a packet 502 may be received at packet processing 510 where a time of receipt may be determined. Packet processing 510 may place the packet 502 into a position 532 in the message buffer 514. Packet processing 510 may also store the time of receipt of the packet 502 associated with the position 532 of the message buffer 514 that the packet 502 was stored. This is repeated for each message as they arrive at packet processing 510. In this way, the time of receipt of a packet 502 will indicate an order relative to another packet 503 such that a destination application 520 may use the time of receipt information to determine that a packet 502 was received by packet processing 510 after another packet 503.

More generally, as in FIG. 5B, each of the packets 501 is received and an order of receipt relative to other packets is determined. Also as in FIG. 5B, the order buffer 516 may contain information indicating an order the packets 501 were received. For example, an indication that Packet 1 was received prior to Packet 2, and Packet 2 prior to Packet 3 will be recorded. In an embodiment, the message buffer 514 may be a buffer configured to operate as a First In First Out buffer ("FIFO"), and as such the packets 501 may not be stored in the message buffer 514 in the order of receipt. The order buffer 516 may then provide the order information for the destination application by associating a particular packet 502 with a particular position 532 of the message buffer 514. The destination application 520 then only checks a single buffer 514 for the packets 501, instead of the multiple source buffers 511, 512, 513 required in FIG. 5B. Therefore, the communication of both the order of receipt of the packets and the packets 501 themselves is facilitated.

In an embodiment, such as an embodiment involving TCP, the communication of packets from source to destination application involves networks that operate on a layered model, such as the Open Systems Interconnection ("OSI") model. OSI involves seven layers of communication. A physical layer conveys the bit stream, such as an electrical impulse, light or radio signal, physically through the network at the electrical and mechanical level. A data link layer encodes and decodes the bit stream into bits. A network layer provides switching and routing technologies, creating logical paths for transmitting data from node to node through a network. A transport layer provides transfer of data between end systems, or hosts, and is responsible for end-to-end error recovery and flow control. A session layer establishes, manages and terminates connections between applications. A presentation layer works to transform data into a form that the application layer can accept, and an application layer supports applications and end-user processes. Relating these layers to FIG. 5C, the receiving of packets and the storing of packets in the message buffer 514 may be handled by a network layer, and the destination application 520 may access the singular message buffer 514 via a transport layer coupled with the network layer. Also, in an embodiment, a packet may be considered received when acted upon at the network layer, such as in processing a packet according to TCP standards.

In an embodiment, packet deterministic processing 501 may be performed by a market, the plurality of packets 501 may be orders to buy or sell, the sources may be trading entities, and a destination application 520 may be an order entry gateway that provides orders to buy or sell to the market. The deterministic processing of the plurality of electronic message packets 501 ultimately communicated to an order book via a network from multiple different trading entities may be facilitated by receiving each of the plurality of electronic message packets 501 representing orders from the network. The deterministic processing may be further facilitated by determining upon receipt of the electronic message packets 501, but prior to the received electronic message packets 501 being provided to the order entry gateway, an order in which each electronic message packet was received relative to the reception of others of the plurality of electronic message packets, the order being determined irrespective of which trading entity of the multiple different trading entities each of the received electronic message packet originated from. The deterministic processing may also be facilitated by providing the electronic message packets to the order book. For example, the electronic message packets may be provided in a single buffer 514 regardless of the trading entity that originated the electronic message packet. Another buffer 516 may also be provided indicating the order in which the electronic message packets 501 were received. The other buffer 516 may be a side-long-buffer configured to correlate to the electronic message packets in the message buffer 514 so as to convey the determined order. An order entry gateway may then be configured to collect the electronic message packets 501 and the determined order from the two buffers 514, 516 and provide them for the order entry gateway. The order entry gateway may then provide the electronic message packets and the determined order to an order book. A match engine may then use the electronic message packets and the determined order to match orders represented by the electronic message packets based on a priority determined from the determined order.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above, such as the processor 202, may be a computer system 400 or a component in the computer system 400. The computer system 400 may implement embodiments for facilitation of deterministic management of electronic message packets.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof The connection with the network 420 may be a physical connection, such as a wired Ethernet connection or may be established wirelessly as discussed below. Likewise, the additional connections with other components of the system 400 may be physical connections or may be established wirelessly. In an embodiment, the communication interface 418 may be configured to communicate electronic message packets through the network 420 to a common destination.

The network 420 may include wired networks, wireless networks, or combinations thereof The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a reconfigurable logic device or an ASIC (application specific integrated circuit). As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" will refer to data processing functionality that is deployed on a GPP. The term "firmware" will refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together"—somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory. In an embodiment, the deterministic message processor 220 shown in FIG. 2A may be implemented using an FPGA or an ASIC. For example, the packet order determining 256 and/or the packet processing 258 may be implemented as an FPGA. In an embodiment, both the packet order determining 256 and the packet processing 258 may be implemented using the same FPGA.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for facilitation of deterministic management of a plurality of electronic message packets comprising orders to trade communicated to an application via a network from a plurality of message sources comprising market participants, the application comprising an order entry gateway for use with an exchange operational to match trades using the electronic message packets, the method comprising:

receiving, by a processor, each of the plurality of electronic message packets from the network at a common destination to which all of the plurality of electronic message packets are directed;

determining, by the processor at the common destination automatically upon receipt thereof prior to each of the received electronic message packets being provided to the application, an order in which each electronic message packet was received relative to the reception of others of the plurality of electronic message packets, the order being determined irrespective of which message source of the plurality of message sources each of the received electronic message packets originated;

storing, by the processor in a memory coupled with the processor, the received plurality of electronic message packets in an arrangement which associates received electronic message packets according to a same respective message source of the plurality of message sources from which each of the received electronic message packets respectively originated irrespective of the time of receipt thereof; and providing the determined order to the application;

wherein the application accesses the received electronic message packets in the memory according to the determined order irrespective of the message source.

2. The method of claim 1, wherein each of the plurality of electronic message packets comprise a format for transmission using Transmission Control Protocol ("TCP").

3. The method of claim 1, wherein the order comprises data indicative of a time of receipt of each of the plurality of electronic message packets.

4. The method of claim 1, wherein the order comprises a sequential series of numbers assigned to each of the plurality of electronic message packets.

5. The method of claim 1 further comprising:
storing the plurality of electronic message packets for the application in at least one message buffer, and storing data indicative of the determined order in a buffer separate from the at least one message buffer.

6. The method of claim 1, wherein the order in which each electronic message packet was received facilitates a determination of a relative priority by the application for each received electronic message packet of the plurality of electronic message packets.

7. A system for facilitation of deterministic management of a plurality of electronic message packets comprising financial messages communicated to an application via a network from a plurality of message sources comprising market participants, the application comprising an order entry gateway for use with an electronic exchange operational to match trades using the financial messages, the system comprising:

a processor and a memory coupled therewith;

a first logic stored in the memory at a common destination to which all of the plurality of electronic message packets are directed and configured to be executed by the processor to cause the system to receive each of the plurality of electronic message packets from the network;

a second logic stored in the memory and configured to be executed by the processor to cause the system to determine, automatically upon receipt thereof prior to each of the received electronic message packets being provided to the application, an order in which each electronic message packet was received at the common destination relative to the reception of others of the plurality of electronic message packets, the order being determined irrespective of which message source of the plurality of message sources each of the received electronic message packets originated, and store in the memory the received plurality of electronic message packets in an arrangement which associates received electronic message packets according to a same respective message source of the plurality of message sources from which each of the received electronic message packets respectively originated irrespective of the time of receipt thereof; and a third logic stored in the memory and configured to be executed by the processor to cause the system to provide the determined order to the application and allow the application to access the received electronic message packets in the memory according to the determined order irrespective of the message source.

8. The system of claim 7, wherein each of the plurality of electronic message packets comprise a format for transmission using Transmission Control Protocol ("TCP").

9. The system of claim 7, wherein the order comprises data indicative of a time of receipt of each of the plurality of electronic message packets.

10. The system of claim 7, wherein the order comprises a sequential series of numbers assigned to each of the plurality of electronic message packets.

11. The system of claim 7 further comprising:
a fourth logic stored in a memory and configured to be executed by the processor to cause the system to store the plurality of electronic message packets for the application in at least one message buffer, and wherein data indicative of the determined order is stored in a buffer separate from the at least one message buffer.

12. The system of claim 7, wherein the order in which each electronic message packet was received determines a relative priority at the application for each received electronic message packet of the plurality of electronic message packets.

13. A system for facilitation of deterministic management of a plurality of electronic message packets comprising financial messages communicated to an application via a network from a plurality of message sources comprising market participants, the application comprising an order entry gateway for use with an exchange operational to match trades using the financial messages, the system comprising:

at least one memory, at a common destination to which all of the plurality of electronic message packets are directed, operable to store the plurality of electronic message packets in an arrangement which associates received electronic message packets according to a same respective message source of the plurality of message sources from which each of the received electronic message packets respectively originated irrespective of the time of receipt thereof; and at least one processor configured to cause the system to:
receive each of the plurality of electronic message packets from the network at the common destination;
determine, automatically upon receipt thereof prior to each of the received electronic message packets being provided to the application, an order in which each electronic message packet was received relative to the reception of others of the plurality of electronic message packets, the order being determined irrespective of which message source of the plurality of message sources each of the received electronic message packets originated; and provide the determined order to the application and allow the application to access the received electronic message packets in the memory according to the order.

14. The system of claim 13, wherein each of the plurality of electronic message packets comprise a format for transmission using Transmission Control Protocol ("TCP").

15. The system of claim 13, wherein the order comprises data indicative of a time of receipt of each of the plurality of electronic message packets.

16. The system of claim 13, wherein the order comprises a sequential series of numbers assigned to each of the plurality of electronic message packets.

17. The system of claim 13, wherein the processor is further configured to cause the system to store the plurality of electronic message packets for the application in at least one message buffer, and wherein data indicative of the determined order is stored in a buffer separate from the at least one message buffer.

18. The system of claim 13, wherein the order in which each electronic message packet was received determines a relative priority at the application for each received electronic message packet of the plurality of electronic message packets.

* * * * *